P. C. HEWITT.
ELECTRODE FOR VAPOR APPARATUS.
APPLICATION FILED APR. 7, 1904.
1,110,544.
Patented Sept. 15, 1914.
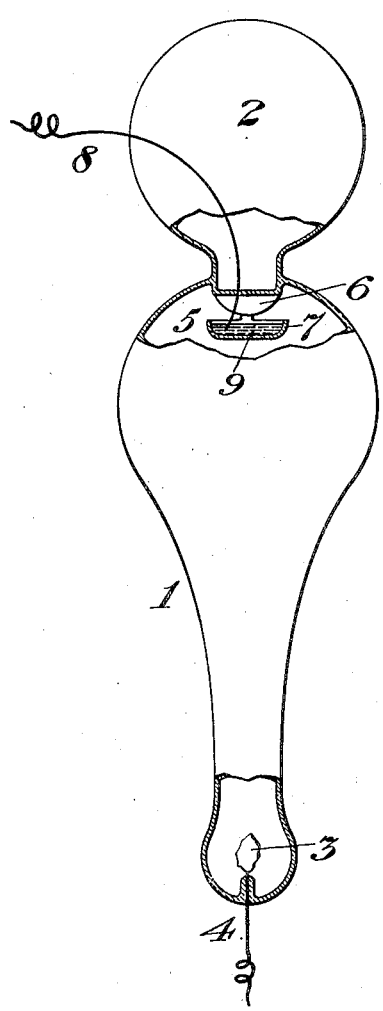
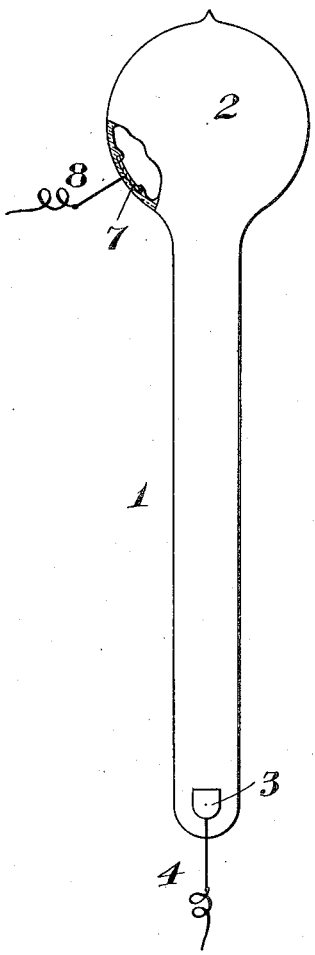

UNITED STATES PATENT OFFICE.

PETER COOPER HEWITT, OF NEW YORK, N. Y., ASSIGNOR, BY MESNE ASSIGNMENTS, TO COOPER HEWITT ELECTRIC COMPANY, OF HOBOKEN, NEW JERSEY, A CORPORATION OF NEW JERSEY.

ELECTRODE FOR VAPOR APPARATUS.

1,110,544.  Specification of Letters Patent.  Patented Sept. 15, 1914.

Application filed April 7, 1904.  Serial No. 202,013.

*To all whom it may concern:*

Be it known that I, PETER COOPER HEWITT, a citizen of the United States, and resident of New York, county of New York, State of New York, have invented certain new and useful Improvements in Electrodes for Vapor Apparatus, of which the following is a specification.

It has been customary in constructing vapor electric devices such as are represented by mercury vapor apparatus designed for use as lamps, current rectifiers, or for other purposes, to use mercury as the negative electrode, this being a material which, when vaporized by the current, can be collected elsewhere and returned by gravity to replenish the original electrode material. This implies generally that the negative electrode is located at or near the bottom of the apparatus.

The purpose of the present invention is to provide means whereby the negative electrode, wherever located, may be replenished by reason of its physical characteristics without regard to the action of gravity. The same may be attained by chemical or physical action, but for present purposes I content myself with a purely physical example by way of illustration. The same law applies to other volatilizable substances besides mercury. This object is attained by maintaining the negative electrode at a lower temperature than the surrounding vapor, thus forming a condensing point of the electrode.

In case mercury is the vapor contained in the apparatus, the restoration of the mercury to the condensing point in the apparatus may be accomplished by maintaining the material of the electrode at a temperature lower than that of the mercury vapor, which condition will cause the mercury to condense on the cooled solid surface, thus enabling a material forming the negative electrode to act as a negative electrode in substantially the same manner as if the electrode were of mercury. The same result would be obtained by the use of any condensible gas provided the apparatus and the electrode were operated at suitable temperatures. I have found, for example, that when it is desirable to locate the positive electrode at some particular part of the apparatus, say at the bottom thereof, and the negative electrode in some higher position, this may be accomplished by cooling a solid electrode and thereby securing through condensation a sufficient deposit of volatilizable electrode material to replace that which has been volatilized by the current on the said solid electrode, the latter being located at the preferred point in the apparatus. Should mercury be the vaporizable material employed in the apparatus, the solid material selected for the purpose above set forth may be a material which is wetted by mercury, in which case, it is found that sufficient mercury may be condensed upon the solid electrode and adhere to it to supply the needs of the apparatus. As an example of a material which may be employed for the purpose indicated, I may mention, among other things, platinum.

As an alternative means for securing the results aimed at herein, the solid electrode may be given such physical characteristics as will enable it to hold on its surface the material required for the disintegration of the negative electrode. For example, the solid electrode may be extended in the shape of a plate or cup which may catch and hold the mercury or other material as it is condensed by the cooling means, the chief requisite appearing to be that the material so held should come into electrical contact with the electrode. This arrangement may be found effective when the material of the solid electrode is of such character that the material does not suitably adhere to the surface. In such cases the cooled surface need not be an electric conductor.

My invention is illustrated in the accompanying drawings, in which—

Figure 1 is an elevation and part section of a mercury vapor apparatus designed for carrying out my invention; and Fig. 2 illustrates a modification.

Referring first to the second figure of the drawings, 1 is a container of glass or other suitable material, and 2 is a cooling or condensing dome or chamber located at the top thereof. A positive electrode, 3, is located near the bottom of the apparatus and is supplied with a lead-wire, 4, upon which it is supported. A negative electrode is shown at 5, the same consisting in part of a vertically arranged sheet or disk, 6, of platinum or other conducting material, below which is suspended a sheet, 7, of similar material formed into cup or plate shape. The electrode is connected with a lead-wire, 8, for making connection with the outside circuit.
In this form of the electrode, the parts 6 and 7 may be made of a material which is a non-conductor and the lead-wire may be brought directly into contact with the mercury in the cup 7. Special means may be provided for cooling the sheets 6 and 7 and a supply of mercury, 9, is provided in the first instance and is supported upon the cup or plate 7.

In operating the apparatus, the mercury vapors are condensed upon the sheet or disk 6 and fall thence into the cup or plate 7 so that the products of condensation are naturally brought into the cup and serve to renew the electrode material therein. The sheet or disk 6 need not be arranged in a vertical position, it being only necessary that it should be so placed as to naturally shed the condensations which collect upon it into the cup or plate 7. The cup or plate shape described in Fig. 2 is generally used when the material of the cup or plate, is such that the same is not wetted by the mercury or other violatilizable material; although the employment of such a shape would not necessarily exclude the use of a solid electrode material such as platinum, which would be wetted by the mercury or other liquid. When the solid portion of the negative electrode is of platinum or other material which is naturally wetted by the vapors of the selected volatilizable liquid, it need not be formed into the shape of a cup or plate, but may be in the form of a sheet arranged either in a horizontal, vertical or inclined position.

In Fig. 1, I show such a sheet, which may be assumed to be of platinum, arranged in an inclined position on the wall of the cooling or condensing chamber 2. I find in practice that under ordinary conditions a platinum electrode located in this way or in a vertical or a horizontal position, where it is adapted to receive and hold the condensed vapor will serve to insure the carrying on of the operations of the apparatus, provided it is so arranged as to dissipate sufficient heat.

The principle of operation of the electrode herein described, is that it shall have a surface which is continuously renewed during the operation of the device of which it forms part. When the appropriate amount of cooling takes place at the electrode, the vapors within the lamp are condensed and serve to renew the surface of the electrode so as to fulfil the requirements of the operation.

I claim as my invention:—

1. In a gas or vapor electric apparatus, an electrode consisting in part of a cooled solid material located inside the apparatus and in part of a vaporizable material.

2. In a gas or vapor electric apparatus, an electrode consisting in part of a cooled solid material located inside the apparatus and in part of a vaporizable material, the material of the solid portion of the electrode being capable of being wetted by the vaporizable material of the electrode.

3. In a gas or vapor electric apparatus, an electrode consisting in part of solid material formed into a cup or plate opening into the interior of the apparatus, and in part of a volatilizable material, in combination with means for cooling the solid portion of the electrode.

4. In a gas or vapor electric apparatus, an electrode consisting of solid material inclosed within the apparatus, the said solid material having a surface of vaporizable material.

5. In a gas or vapor electric apparatus, an electrode consisting of solid material inclosed within the apparatus and having a surface of vaporizable material, in combination with means for continuously renewing the said surface.

6. In a gas or vapor electric apparatus, a solid electrode inclosed within the apparatus and having a surface of vaporizable material, and means brought into effect by differences of temperature in the apparatus for renewing the said surface.

7. In a gas or vapor electric apparatus, a solid electrode suitably located inside the apparatus, and a second electrode also inside the apparatus, the said second electrode consisting in part of solid material and in part of vaporizable material, in combination with means for cooling the solid portion of the second electrode.

8. In a gas or vapor electric apparatus, a solid electrode within the same and a second electrode consisting in part of a cooled solid material and in part of a vaporizable material.

9. In a gas or vapor electric apparatus, a solid conducting electrode within the same, and a second electrode consisting in part of a cooled solid material and in part of a vaporizable material, the material of the solid portion of the second electrode being capable of being wetted by the vaporizable material of the said electrode.

10. In a gas or vapor electric apparatus, a solid electrode within the same and a second electrode of solid material having a surface of vaporizable material.

11. In a gas or vapor electric apparatus, a solid electrode within the same and a second electrode of solid material having a surface of vaporizable material, in combination with means for continuously renewing the said surface.

12. In a gas or vapor electric apparatus, a solid electrode within the same and a second electrode consisting of solid material having a surface of vaporizable material, and means brought into effect by difference of temperature in the apparatus for renewing the said surface.

13. The method of operating a vapor electric device which consists in exposing on the interior of the container a conducting material, generating heat and vapor by the normal operation of the system, and cooling in a relatively great degree the said conducting surface by external means so that a sufficient portion of the vapor produced in the operation condenses on the conducting surface and renders it capable of operating as a vaporizable cathode.

14. A vapor electric apparatus, comprising an exhausted container, vaporizable material therein, an electrode located at the natural drainage point of said liquid material when condensed and a second electrode having an operative surface composed of said liquid material, together with means for maintaining said liquid surface during operation, said means consisting of heat withdrawing means in metallic contact with said liquid surface.

15. A vapor electric apparatus, comprising an exhausted container, vaporizable material therein, an anode located at the natural drainage point of said liquid material when condensed and a cathode having an operative surface composed of said liquid material, together with means for maintaining said liquid surface during operation, said means consisting of heat withdrawing means in metallic contact with said liquid surface.

16. In a vapor electric apparatus, the combination with an exhausted container including a vaporizable liquid, of a cathode having an operative surface of said liquid and located out of the natural reservoir formed from liquid condensed on the walls of said chamber, together with means for maintaining said liquid cathode surface, said means consisting of cooling means in contact with said cathode surface.

17. A vapor electric apparatus including an exhausted container, a mercury cathode surface and means for maintaining by condensation said surface during operation, including means independent of the vaporization of mercury for the absorption of heat from said surface at a rate at least equal to the generation of heat therein.

18. In a vapor electric apparatus, an exhausted container and a cathode therein with a liquid surface, together with metallic cooling means in contact with said liquid surface.

Signed at New York, in the county of New York, and State of New York, this 1st day of April A. D. 1904.

PETER COOPER HEWITT.

Witnesses:
ALBERT P. WILLS,
WM. H. CAPEL.